No. 758,283. PATENTED APR. 26, 1904.
F. SHAFER.
CALIPERS.
APPLICATION FILED JUNE 8, 1903.
NO MODEL.
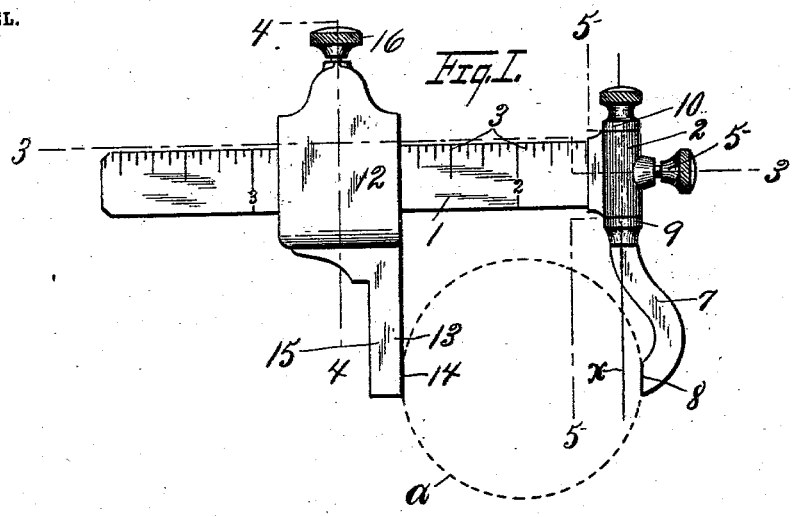
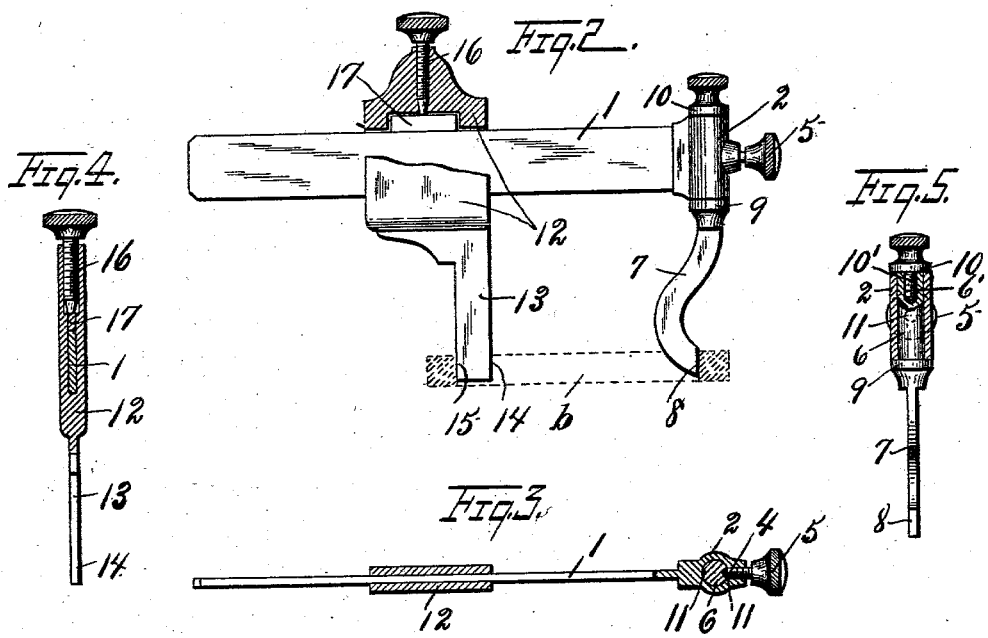
Witnesses:
F. E. Arthur,
H. E. Chase
Inventor.
Frank Shafer
By Howard P. Davison
Attorney.

No. 758,283.

Patented April 26, 1904.

UNITED STATES PATENT OFFICE.

FRANK SHAFER, OF CAMILLUS, NEW YORK.

CALIPERS.

SPECIFICATION forming part of Letters Patent No. 758,283, dated April 26, 1904.

Application filed June 8, 1903. Serial No. 160,572. (No model.)

*To all whom it may concern:*

Be it known that I, FRANK SHAFER, of Camillus, in the county of Onondaga, in the State of New York, have invented new and useful Improvements in Calipers, of which the following, taken in connection with the accompanying drawings, is a full, clear, and exact description.

This invention relates to improvements in calipers, and is particularly useful as a machinist's tool for sizing two parts, one of which is adapted to fit closely into the other—as, for instance, the fitting of a shaft into a bore or bearing.

The object of this invention is to enable the user to accurately determine the correct sizes of two parts, one of which is adapted to fit into the other without shifting the position of the sliding jaw or arm after once being set at the desired graduation, or, in other words, to provide for the measurement of two substantially identical dimensions, one being inside, as in the case of a bore or opening, and the other for external measurement, as in the case of a shaft or bar which is adapted to closely fit in said opening.

Further objects will appear in the subsequent description.

In the drawings, Figure 1 is a side elevation of my improved caliper in position for measuring the diameter of a shaft. Fig. 2 is a similar elevation, partly in section, showing the device as used for measuring the interior diameter of a bore or opening. Figs. 3, 4, and 5 are sectional views taken, respectively, on lines 3 3, 4 4, and 5 5, Fig. 1.

Similar reference characters indicate corresponding parts in all the views.

In order to fully explain the objects of this invention, I have shown a flat straight bar 1 as provided with a tubular head 2 and graduations 3, the tubular head 2 being disposed at right angles to the bar and formed with a threaded aperture 4 in one of its side walls for receiving a set-screw 5. Journaled in this tubular head is a cylindrical shank 6, having a depending jaw or arm 7, which is reversible and is formed with an engaging face 8 parallel with the axis of rotation, said shank being provided with lower and upper heads 9 and 10, which engage the end faces of the tubular head 2 and prevent endwise movement of the shank 6 and its arm 7, the head 10 having a threaded portion 10', which is screwed into a threaded socket 6' in the upper end of the shank 6 to enable the latter to be inverted into or removed from the head 2.

It is evident from the foregoing description that the arm 7 is rotatable in the head 2—that is, it may be reversed, so as to present the face 8 inwardly or outwardly, as may be desired, the shank 6 being provided with diametrically opposite recesses 11 to receive the inner end of the screw 5, which operates to hold the arm 7 in its adjusted position or from further rotary movement.

Mounted upon the blade or bar 1 is a sliding block 12, having a depending arm 13, which is provided with opposite contact-faces 14 and 15, one of these faces, as 14, being used for measuring exterior dimensions and the other, as 15, being employed in connection with the member 7 for measuring interior dimensions, as, for instance, openings. The contact-face 8 of the revolving arm 7 is disposed at one side of the axis of rotation (designated by the reference-letter $x$, Figs. 1 and 2) a distance equal to substantially one-half of the distance between the contact-faces 14 and 15, so that the variation in the position of the contact-face 8 in its two extreme positions at opposite sides of the axis is substantially equal to the width of the arm 13 between the faces 14 and 15. It follows, therefore, that when the arm 7 is adjusted so that its contact-face 8 is presented toward the contact-face 14 of the arm 13, as seen in Fig. 1, for measuring external dimensions, the distance between said contact-faces 8 and 14 is substantially the same as the distance between the contact-faces 8 and 15 when the arm 7 is rotated in the reverse direction to present the face 8 outwardly, as seen in Fig. 2, for measuring the inside dimensions of openings. It is now seen when the head 12 is set at the desired graduation for measuring the external surface of a body, as for instance, the shaft $a$, (shown by dotted lines in Fig. 1,) this head is clamped in position by a set-screw 16, operating upon a suitable gib 17, which bears upon the blade 3, and when it is desired to form an opening—as, for instance, a bore b, Fig. 2—it is simply necessary to release the set-screw 5 and to then rotate the arm 7 a half-revolution, so that the contact edge 8 faces outwardly instead of inwardly, as seen in Fig. 1, in which instance the faces 8 and 15 are used in gaging this opening, and when it is desired to reproduce a shaft of the same dimensions it is simply necessary to return the arm 7 to the position seen in Fig. 1 and to again clamp it in place by the screw 5, and the operation may be repeated for external dimensions as many times as may be desired without changing the position of the sliding block 12.

The operation of my invention will now be readily understood upon reference to the foregoing description and the accompanying drawings, and it will be noted that the amount of offset of the contact edge 8 at one side of the axis of revolution of the arm 7 depends upon the width of the arm 13 or rather the distance between the contact-faces 14 and 15, the only requirements being that the amount of offset from the axis being substantially equal to one-half of the distance between said contact-faces 14 and 15.

Having thus described my invention, what I claim, and desire to secure by Letters Patent, is—

1. In a caliper, the combination with a graduated bar, an arm rotatingly mounted on the bar with its axis at right angles to the bar and provided with a contact-face at one side of its axis, and a second arm slidingly mounted on the bar and provided with opposite contact-faces separated from each other a distance equal to twice the distance between the contact-face of the first-named arm and its axis of rotation.

2. A caliper comprising a bar having a tubular head, an arm on the bar having opposite contact-faces, a second arm reversibly mounted in the head and having a contact-face located at one side of its axis of rotation a distance equal to one-half of the distance between the contact-faces of the first-named arm for the purpose described.

3. A caliper comprising a bar having a tubular head, a sliding block mounted on the bar and provided with an arm having opposite contact edges or faces, a second arm reversible in the tubular head and having a contact face or edge at one side of its axis of revolution and means for clamping the latter arm in position.

4. In a caliper, a support, a sliding block on the support having an arm provided with opposite contact edges, means for clamping the block to the support for holding the arm in position, a reversible arm mounted upon the support and provided with a single contact-face disposed so that when the latter arm is reversed the distance between the two positions of the contact-face is substantially equal to the distance between the contact edges of the first-named arm.

5. In a caliper, a bar having a tubular head, a rock-arm journaled in the tubular head and provided with a contact-face at one side of its axis, means for holding the arm in its adjusted position, a second arm mounted upon the bar and adjustable lengthwise thereof and provided with opposite contact-faces separated from each other a distance equal to substantially twice the distance of offset of the contact edge of the former arm from its axis of rotation and means for clamping the second arm in its adjusted position.

6. In a caliper, a bar having a tubular head, a sliding block mounted on the bar and provided with an arm having opposite contact-faces, a second arm journaled in the tubular head and provided with a contact-face disposed at one side of its axis of revolution a distance equal to substantially one-half of the distance between the opposite contact-faces of the first-named arm and means for clamping the second arm in position.

7. A caliper comprising a bar, two arms mounted on the bar, one arm having opposite parallel contact edges, and the other arm having a single contact-face, the latter arm being reversible on an axis parallel with said contact edges to present its contact-face toward or from the other arm.

8. A caliper having a slidable jaw and a rotatable jaw, both bars having contact-faces parallel with the axis of rotation of the rotatable jaw, whereby the same contact-face of the rotatable jaw may be presented toward or from the other jaw.

9. A caliper comprising a support and two measuring-jaws one being rotatable and the other slidable on the support, the sliding jaw having two contact-faces and the rotatable jaw having its axes of rotation parallel with said contact-faces and provided with a contact-face at one side of said axis a distance equal to half of the distance between the contact-faces of the slidable jaw, whereby when the rotatable jaw is reversed its contact-face occupies different positions, the distance between which is equal to the distance between the faces of the slidable jaw.

In witness whereof I have hereunto set my hand this 3d day of June, 1903.

FRANK SHAFER.

Witnesses:
   Austin E. Daniels, Jr.,
   F. W. Slocum.